April 5, 1949.  H. P. PHILLIPS  2,466,474
PISTON RING ELEMENT
Filed Sept. 27, 1946  2 Sheets-Sheet 1
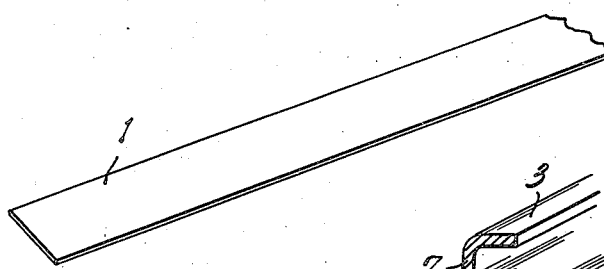
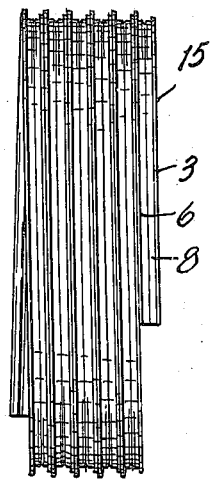
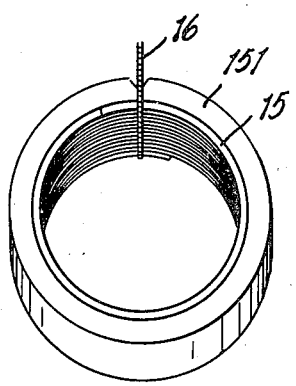
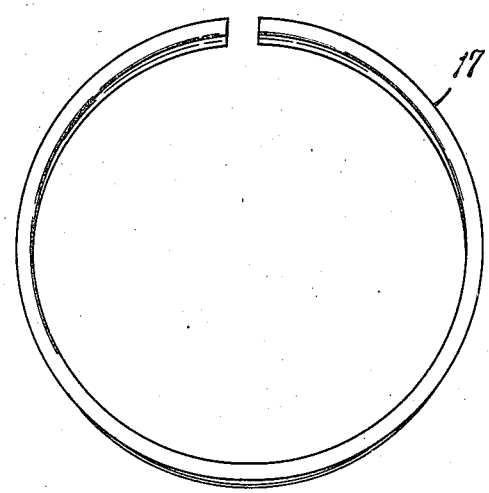
INVENTOR.
Harold P. Phillips
BY Otto A. Earl
Attorney.

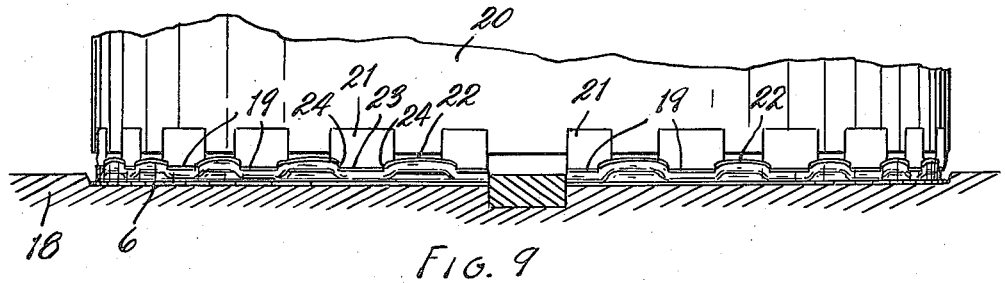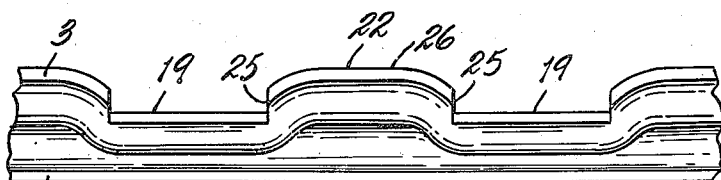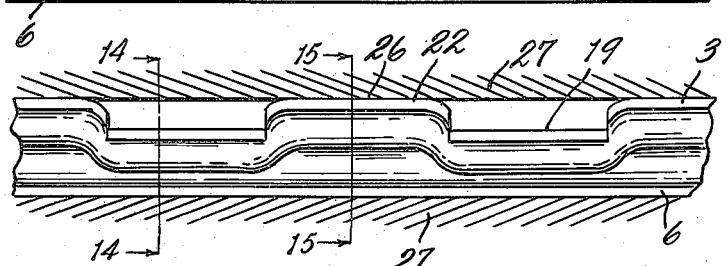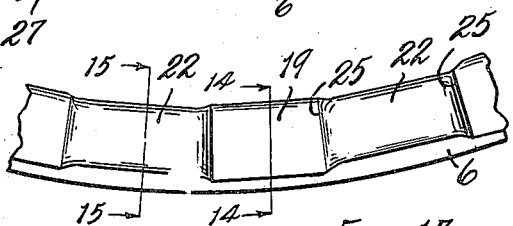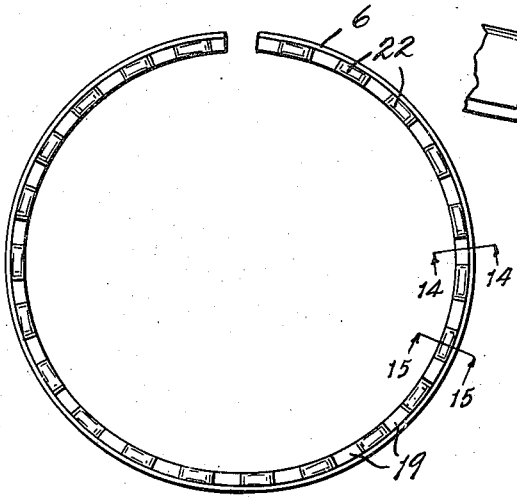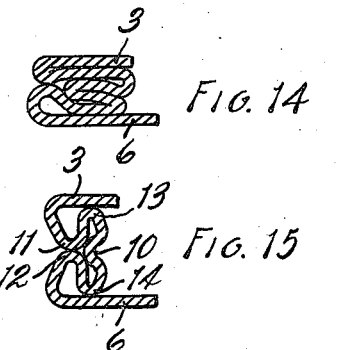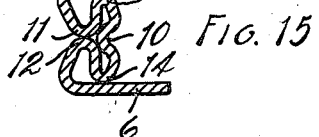

Patented Apr. 5, 1949

2,466,474

UNITED STATES PATENT OFFICE 2,466,474

PISTON RING ELEMENT

Harold P. Phillips, Hastings, Mich., assignor to Hastings Manufacturing Company, Hastings, Mich., a corporation of Michigan Application September 27, 1946, Serial No. 699,739

9 Claims. (Cl. 309—44)

1

This invention relates to improvements in piston ring elements.

The main objects of the invention are:

First, to provide a piston ring formed entirely of ductile metal which can be readily and economically fabricated and is not likely to be broken or distorted in use.

Second, to provide a piston ring element having these advantages with the advantage of very free drainage thereby adapting it for use as an oil ring.

Third, to provide a piston ring element formed entirely of ductile metal having side drainage openings, the stock or metal being continuous from end to end of the ring thereby providing uniform characteristics of strength and resilience and expansibility throughout the length of the ring.

Fourth, to provide a piston ring element formed of ductile metal which may be used as a spacer element in combination with flat elements formed of ribbon steel.

Objects relating to details and economies of the invention will appear from the detailed description to follow. The invention is defined and pointed out in the claims.

A preferred embodiment of the invention is illustrated in the accompanying drawings, in which:

Fig. 1 is a perspective view of a strip or ribbon of steel or other metal such as is used in the forming of a piston ring element.

Figs. 2, 3, 4 and 5 are enlarged fragmentary perspective views in transverse section of the metal ribbon of Fig. 1 illustrating successive steps in rolling the strip to formation.

Fig. 6 is a view in side elevation illustrating the metal ribbon in coiled form after having been rolled to the shape of Fig. 5.

Fig. 7 is a perspective view illustrating the step of cutting the continuous coil of Fig. 6 into individual ring elements.

Fig. 8 is a perspective view of a ring element after the cutting operation of Fig. 7.

Fig. 9 is a fragmentary view partially in section of an anvil and die aparatus used in the upsetting of spaced reaches in the element of Fig. 8 and illustrating a further step in the manufacture, the movable die member being shown in the operative position of the upsetting step.

Fig. 10 is an enlarged edge or peripheral view of the ring element after the upsetting operation of Fig. 9.

Fig. 11 is an edge or peripheral view of the ring element and a sectional view of die members after flattening the tops of the spacer reaches of the ring element.

2

Fig. 12 is a plan view of the upset side of the ring element.

Fig. 13 is an enlarged fragmentary view of a portion of the upset side of the ring element.

Fig. 14 is an enlarged view of the ring element on the line 14—14 of Figs. 11 and 13.

Fig. 15 is an enlarged view of the ring element on the line 15—15 of Figs. 11 and 13.

The embodiment of the invention disclosed constitutes a modification or an improvement upon that disclosed in my Patent No. 2,404,862, granted July 30, 1946.

In considering the accompanying drawings, it should be borne in mind that no attempt has been made to show the parts in their relative proportion or where asociated with a piston to show the clearances and relative dimensions.

The stock of ductile ribbon metal 1 in Fig. 1 is relatively thin but it may vary a considerable amount in thickness, depending somwhat on the size of the ring and the character of the material used. If the element is designed or intended merely as a spacer for a pair of cylinder wall engaging side members, such as shown for example in Figs. 5, 6 and 7 in my patent above mentioned the spacer element may be of relatively soft material. However, it may desirably be made of wear resisting materials even when used as a spacer, one side member being used as a cylinder wall engaging or contacting element.

The ring element is formed of a strip or ribbon 1 of the ductile steel which is folded longitudinally upon itself as shown in Fig. 2 forming the parallel wall portions 3, 4, 5 and 6, connected by the intermediate wall portions 7, 8 and 9, the last named wall portions being disposed substantially at right angles to the parallel portions 3, 4, 5 and 6 and connected thereto by relatively sharp bends. The longitudinal folds thus formed can be effected by suitable folding rollers which are not illustrated as they form no part of the invention. The parallel portions 3 and 6 constitute side walls or members of the completed ring element, and the side member 6 is preferably substantially wider than the side member 3 to constitute a cylinder wall engaging element. Figs. 3, 4 and 5 illustrate succeeding successive steps in the shaping or forming of the ring element, such steps being successively effected by suitably shaped folding rollers. In the step of Fig. 3 the connecting intermediate portion 8 is bent inwardly between the parallel portions 4 and 5 to form the longitudinal fold or indentation 10.

In the final longitudinal folding step of Fig. 5 the strip 1 has been so folded as to provide the side walls 3 and 6 and intermediate thereof the folds 10, 11, 12, 13 and 14. The bights of folds 11 and 12 are in substantially abutting relation with each other, and the bights of folds 13 and 14 are in abutting relation with the side walls 3 and 6 respectively. The walls or plies of fold or indentation 10 are disposed substantially in vertical alignment with each other and the bight of this fold abuts the folds 11 and 12 adjacent the bights thereof. The walls or plies of each of the folds 11, 12, 13 and 14 on the opposite sides of the bight thereof are disposed substantially vertical or at right angles to the side walls 3 and 6. This provides a very strong and rigid supporting structure between the side walls 3 and 6 to resist collapse thereof towards each other during the subsequent compressing or stamping operations hereafter described and also resists any tendency of the metal in the spacer reaches of the completed ring element hereafter described from becoming pounded down to a lesser axial width while operating in the ring groove of a piston. In other words the stiffness put into the ring element by this structure resists any tendency of the ring to crush and lose its width dimension, such crushing being caused by the inertia pounding of the ring in the groove and by the pressure of the explosive gases.

After the strip 1 is folded longitudinally upon itself into the shape shown in Fig. 5 it is coiled edgewise as shown at 15 in Fig. 6 into a succession of integrally connected complete coils. The strip thus coiled is placed in a work holder 151 and then cut into annular elements by a cutting saw 16 as shown in Fig. 7. An annular element 17 so cut is shown in Fig. 8.

The annular element 17 is laid upon an anvil member 18, with its flat side wall 6 against the anvil. Spaced reaches 19 are then upset axially by means of a die member 20 having an annular series of spaced upsetting elements 21 which axially compress at spaced intervals the annular ring element from the cross sectional shape shown in Fig. 5 into the flattened or collapsed shape shown in Fig. 14. The reaches 22 between the upset reaches 19 constitute spacing members and are of substantially the cross sectional shape shown in Figs. 5 and 15. It will be noted by reference to Fig. 9 that the bottom walls 23 of the upsetting members 21 terminate sharply at the ends thereof in vertical forming walls 24. During the downward or stamping operation of the die member 20 the upsetting members 21 so shaped correspondingly shape the end walls 25 of the spacing reaches 22—that is, bend said end walls sharply at right angles to the plane of the ring element. These vertical walls give rigidity and stiffness to the spacing reaches and assist in preventing the collapse or the pounding down thereof to a lesser axial width while operating in the ring groove of a piston. Fig. 11 shows the ring element in the operation of having the top surfaces 26 of its spacer reaches 22 flattened between the die members 27. The axial upset reaches 19 alternate with the spacer reaches 22 and constitute oil drain reaches.

When the elements are removed from the die they normally spring to the open position shown in Fig. 12 and when they are inserted into a cylinder they are collapsed and they normally exert a substantial radial thrust against the cylinder wall. These elements are preferably formed of wear resisting steel of proper carbon content although other wear resisting metals and materials may be used. Steel is found highly satisfactory particularly where the element is designed as a cylinder wall engaging element.

It will be noted that no part of the ring element is cut away. The result is that the element has very uniform strength and tension from end to end. It is not subject to breakage or likely to be permanently distorted in manipulations to install the same. It may be made of quite thin stock consequently presenting a thin or relatively sharp edge to the cylinder wall and at the same time the cylinder wall engaging member is supported close to the edge thereof and is reinforced so that it will not distort or vibrate in use.

I have illustrated and described a very practical embodiment of the invention. I have not attempted to illustrate or describe other embodiments or adaptations as it is believed that this disclosure will enable those skilled in the art to embody or adapt the invention as may be desired.

Having thus described my invention, what I claim as new and desire to secure by Letters Patent, is:

1. A split annular piston ring element formed of ribbon ductile metal folded longitudinally into a plurality of plies, one of said plies being flat and constituting a side member, another of said plies constituting a second side member spaced from the first named side member, other plies being integrally connected by folded over edge portions and being disposed intermediate said side members and disposed in closely adjacent generally parallel relation to each other and at substantially right angles to said side members and having the bights of the folded over edge portions thereof in supporting engagement with said side members to rigidly support said side members in spaced relation against tendency to collapse towards each other, spaced reaches of said second side member and intermediate plies being upset axially into side by side contacting relation with each other, the reaches intermediate said upset reaches being of an axial width substantially exceeding the upset reaches and providing therewith alternate spacer reaches and drain reaches, said first named side member projecting radially outwardly to constitute a cylinder wall engaging element.

2. A split annular piston ring element formed of ribbon ductile metal folded longitudinally into a plurality of plies, one of said plies being flat and constituting a side member, another of said plies constituting a second side member spaced from the first named side member, other plies being integrally connected by folded over edge portions and being disposed intermediate said side members and disposed in closely adjacent generally parallel relation to each other and at substantially right angles to said side members and having the bights of the folded over edge portions thereof in supporting engagement with said side members to rigidly support said side members in spaced relation against tendency to collapse towards each other, spaced reaches of said second side member and intermediate plies being upset axially into side by side contacting relation with each other, the reaches intermediate said upset reaches being of an axial width substantially exceeding the upset reaches and providing therewith alternate spacer reaches and drain reaches.

3. A split annular piston ring formed of ribbon ductile metal folded into a plurality of longitudinally extending plies, one of said plies being flat and constituting a ring side member, another of said plies constituting a second side member spaced from the first named side member, other plies being disposed intermediate said side members and disposed in closely adjacent substantially parallel relation to each other and at substantially right angles to said side members, said intermediate plies being integrally connected to each other by longitudinally extending relatively sharply bent-over portions, certain of said bent-over portions being in supporting engagement with said side members and other of said bent-over portions being in supporting engagement with each other intermediate said side members, spaced reaches of said second side member and intermediate plies being upset axially into side by side substantially contacting and generally parallel relation, the reaches intermediate said upset reaches being of an axial width substantially exceeding the upset reaches and constituting therewith alternate spacer and drain reaches.

4. A split annular piston ring formed of ribbon ductile metal folded into a plurality of longitudinally extending plies, one of said plies being flat and constituting a ring side member, another of said plies constituting a second side member spaced from the first named side member, other plies being disposed intermediate said side members and disposed in closely adjacent substantially parallel relation to each other and at substantially right angles to said side members, said intermediate plies being integrally connected to each other by longitudinally extending relatively sharply bent-over portions, certain of said bent-over portions being in supporting engagement with said side members, spaced reaches of said second side member and intermediate plies being upset axially into side by side substantially contacting and generally parallel relation, the reaches intermediate said upset reaches being of an axial width substantially exceeding the upset reaches and constituting therewith alternate spacer and drain reaches.

5. A split annular piston ring formed of ribbon ductile metal folded into a plurality of longitudinally extending plies, one of said plies being flat and constituting a side member, another of said plies constituting a second side member spaced from the first side member, other plies being disposed intermediate said side members, said intermediate plies including a ply disposed generally at right angles to the side members and having opposite longitudinally extending bent-over edge portions in supporting engagement with said side members and having intermediate said bent-over edge portions a longitudinally extending radially inwardly indented portion, spaced reaches of said second side member and said intermediate plies being axially upset into substantially contacting and generally parallel relation, the bight of said radially inwardly indented portion constituting the bight of a loop opening radially outwardly in the axially upset reaches of the piston ring.

6. A split annular piston ring element formed of ribbon ductile metal folded longitudinally into a plurality of plies, one of said plies being flat and constituting a ring element side member, another of said plies constituting a second ring element side member spaced from the first named side member, other plies being integrally connected by folded over edge portions and being disposed intermediate said side members and generally substantially at right angles thereto and having the bights of the folded over edge portions thereof in supporting engagement with said side members, spaced reaches of said second side member and intermediate plies being upset axially into contacting relation with each other, the reaches intermediate said upset reaches being of axial width substantially exceeding the upset reaches and providing therewith alternate spacer reaches and drain reaches, said second side member intermediate said spacer and drain reaches being upset relatively sharply from the bottom of the drain reach and substantially at right angles to the plane of the ring element.

7. A split annular piston ring element formed of ribbon ductile metal folded longitudinally into a plurality of plies, one of said plies being flat and constituting a ring element side member, another of said plies constituting a second ring element side member spaced from the first named side member, other plies being integrally connected by folded over edge portions and being disposed intermediate said side members and generally substantially at right angles thereto and having the bights of the folded over edge portions thereof in supporting engagement with said side members, spaced reaches of said second side member and intermediate plies being upset axially into contacting relation with each other, the reaches intermediate said upset reaches being of axial width substantially exceeding the upset reaches and providing therewith alternate spacer reaches and drain reaches, said second side member intermediate said spacer and drain reaches being upset substantially at right angles to the plane of the ring element.

8. A split annular piston ring element formed of ribbon ductile metal folded longitudinally into a plurality of plies, one of said plies constituting a ring element side member, other of said plies extending relatively sharply at substantially right angles from said side member, one of said last named plies having a radially inwardly indented portion, spaced reaches of said other plies being upset axially into substantially contacting and generally parallel relation to said side member, the reaches intermediate said upset reaches being of axial width substantially exceeding the upset reaches and providing therewith alternate spacer reaches and drain reaches, the bight of said radially inwardly indented portion constituting the bight of a loop opening radially outwardly in said axially upset reaches.

9. A split annular piston ring element formed of an integral ribbon-like ductile metal member folded longitudinally to form upper and lower side members, portions extending from corresponding edges of said side members axially towards each other, portions in supporting engagement with each other and extending radially from said axial portions, portions extending axially from said radial portions away from each other at substantially right angles to the side members and terminating in radially disposed portions in supporting engagement with the side members, said last named radial portions being connected by a portion disposed generally at right angles to the side members.

HAROLD P. PHILLIPS.

REFERENCES CITED

The following references are of record in the file of this patent:

UNITED STATES PATENTS

| Number | Name | Date |
| --- | --- | --- |
| 2,404,862 | Phillips | July 30, 1946 |